(12) United States Patent
McPherson et al.

(10) Patent No.: US 6,591,420 B1
(45) Date of Patent: Jul. 8, 2003

(54) REMOTE CONTROL SYSTEM FOR AUDIO AND VIDEO CONTENT

(75) Inventors: Alan J. McPherson, Chatsworth, CA (US); George Lydecker, Burbank, CA (US)

(73) Assignee: Warner Music Group, Inc., Olyphant, PA (US)

( * ) Notice: Subject to any disclaimer, the term of this patent is extended or adjusted under 35 U.S.C. 154(b) by 0 days.

(21) Appl. No.: 09/382,537

(22) Filed: Aug. 25, 1999

(51) Int. Cl.$^7$ ................................................. H04N 7/16
(52) U.S. Cl. ........................... 725/29; 725/25; 725/31; 725/97; 705/50; 705/51; 705/57; 380/203; 380/239; 380/242; 380/277
(58) Field of Search ................................. 380/203, 242, 380/239, 277; 705/57, 50–51; 348/1, 3, 5.5, 7, 9, 474, 477–478; 455/3.1, 6.1, 4.2; 725/31, 71, 78, 29, 25, 97, 104; 709/204–207, 229, 248

(56) References Cited

U.S. PATENT DOCUMENTS

| | | | | |
|---|---|---|---|---|
| 5,243,652 A | * | 9/1993 | Teare et al. | 380/21 |
| 5,555,441 A | * | 9/1996 | Haddad | 455/4.2 |
| 5,619,247 A | * | 4/1997 | Russo | |
| 5,640,453 A | * | 6/1997 | Schuchman et al. | 380/10 |
| 5,642,418 A | * | 6/1997 | Farris et al. | |
| 5,708,961 A | * | 1/1998 | Hylton et al. | 455/4.2 |
| 5,710,815 A | * | 1/1998 | Ming et al. | 380/20 |
| 5,737,009 A | * | 4/1998 | Payton | 348/7 |
| 5,790,423 A | * | 8/1998 | Lau et al. | 364/514 |
| 5,825,876 A | * | 10/1998 | Peterson, Jr. | 380/4 |
| 6,002,852 A | * | 12/1999 | Birdwell et al. | 395/200.33 |
| 6,104,815 A | * | 8/2000 | Alcorn et al. | |

\* cited by examiner

*Primary Examiner*—Andrew Faile
*Assistant Examiner*—Ngoc Vu
(74) *Attorney, Agent, or Firm*—Gottlieb, Rackman & Reisman, P.C.

(57) ABSTRACT

A program distribution system is disclosed for the simultaneous release of a program at a plurality of locations. The locations may include local broadcasters, or even individual devices. A program is modified so that it cannot be played without a release control signal and is then copied and distributed .either fixed in a media or electronically, i.e. via private network, the Internet, etc.) At the receiver the receiver first detects the release control signal and then replays the program at will. The program may include a time stamp in which case the receiver cannot replay the program until a control indicative of a current time/date corresponding to the date stamp. Alternative the program can be encrypted in which case the release control signal includes the decryption key. The release control can be broadcast over a tv channel, a radio channel and so on and is preferably imbedded into the signals of the standard tv or radio signals.

17 Claims, 5 Drawing Sheets

REMOTE CONTROL SYSTEM FOR AUDIO AND VIDEO CONTENT

BACKGROUND OF THE INVENTION

1. Field of Invention

This invention pertains to a distribution scheme for distributing one or more programs for replay by customers wherein the timing of at least a first replay is precisely controlled from a central location. The system is suited for the distribution of musical audio and/or video programs and the like.

2. Background of the Invention

Recently it was found to be advantageous to release certain programs, especially musical selections to either the public at large or to intermediary entities such as radio or tv stations in conjunction with certain related events, such as the premier or broadcasting of a related movie or tv show, a specific date related for example to a concert by an artist, his or her anniversary, or other similar occurrences. In such instances it is found advantageous for marketing purposes to insure that these programs become available to all the intermediary entities and/or retail stores substantially simultaneously to insure that the public is not exposed to these programs prematurely. In addition, when a major new musical release occurs, it is advantageous to make copies available substantially simultaneously through the world, or at least within a given countries. One obvious means of accomplishing simultaneous release of these programs is to send the copies out to the intermediaries or retail outlets ahead of times with instructions on the date and time on which the programs are to be played or the copies are to be made available to the public. However in practice this approach does not work because in most instances the intermediaries or the retail outlets are not under the control of the producers and hence there is no way for the producer to insure that the instructions are followed. In fact, it is to be expected that for major new releases, such instructions are not followed because each retailer and intermediary is anxious to be 'the first on the block' to make the programs available.

Hence, presently, producers stock pile the copies of the programs ahead time at a central location, and then distribute them only a day or two before the critical date or time. Of course this scheme is rather difficult to coordinate precisely especially when the release is to occur simultaneously in different parts of the country or the world.

OBJECTIVES AND SUMMARY OF THE INVENTION

In view of the above discussion, it is an objective of the present invention to provide a program distribution system which insures that a distributed program can be replayed at least a first time only at or after a critical time selectively determined by a distributor.

A further objective is to provide a system of the kind described above which is suitable for distributing a wide variety of programs including musical, programs, video, programs, computer software, and so on.

A further objective is to provide a system which is suitable for distributing program son a large variety of media, including cassettes, CDs, DVDs, floppy disks, and any other similar media.

Other objectives and advantages of the invention shall become apparent from the following description. Briefly, in a distribution system constructed in accordance with this invention, an original program is first recorded on one or more types of media in an encrypted form. The media is then distributed to intermediaries and/or retail outlets. However the recorded program cannot be replayed immediately in a normal fashion because the data has been encrypted. At a later time the producer of the program releases and broadcasts the key required to decrypt the data. This broadcast may occur over the air waves using standard G.P.S. communications, RF signals, or imbedded in TV signals.

Receivers are also provided which have automatic receiving equipment for receiving the key over the corresponding broadcasting media. The receiver can then proceed when requested to replay the program by decrypting the data using the received key.

Alternatively, the decrypting key may be provided to the receiver by some other means, and the receiver may be arranged and constructed to start decrypting only after a predetermined trigger signal has been received.

In a simplified version of the invention, the program is recorded without encoding, however it cannot be replayed without a specific release signal.

DETAILED DESCRIPTION OF THE INVENTION

Figure 1:
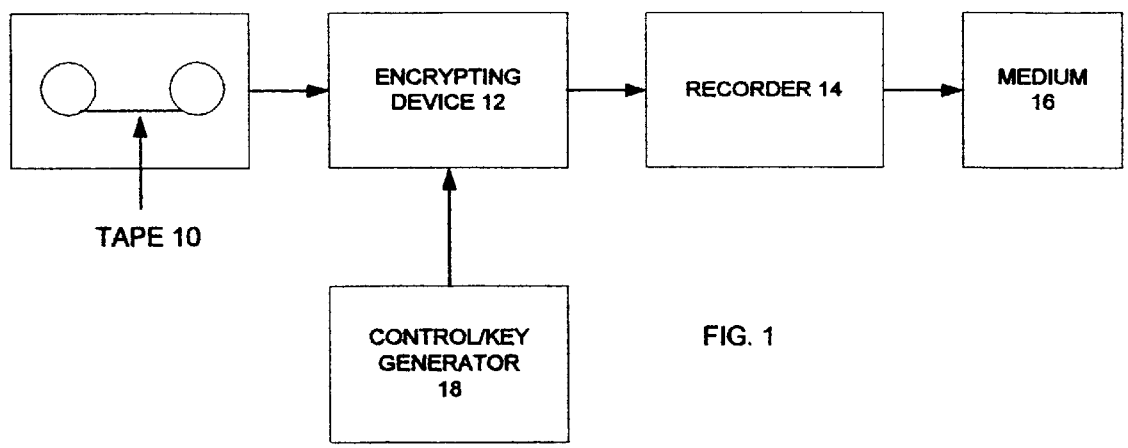
FIG. 1 shows a block diagram illustrating the production of the media with an encrypted program.

Starting with FIG. 1, a program is recorded on a preselected medium in accordance with the present invention as follows. The program has been previously recorded as digital data on a first medium which in FIG. 1 is symbolically illustrated as a magnetic tape 10. This program is now retrieved and fed to an encrypting device 12. Depending on a particular scheme used the encrypting device modifies this data and then sends it on for writing by a recorder 14 on an appropriate medium 16. This medium 16 can be a cassette, a CD, a DVD, or any other similar media. In the simplest form, the encrypting device 12 merely receives a time code from a control key generator 18 and introduces or attaches this time code into the data fed to recorder 14. In a more complex scheme, the encrypting device receives an encryption key from control key generator 18 and uses this key to encrypt the data. Obviously, the process described so far may be repeated any number of times and the data thus generate can be recorded not only a single type of media but on several different types. Finally, while the recordal of single medium 16 is described for the sake of simplicity, it should be understood that a large number of such media may be recorded simultaneously.

Figure 2:
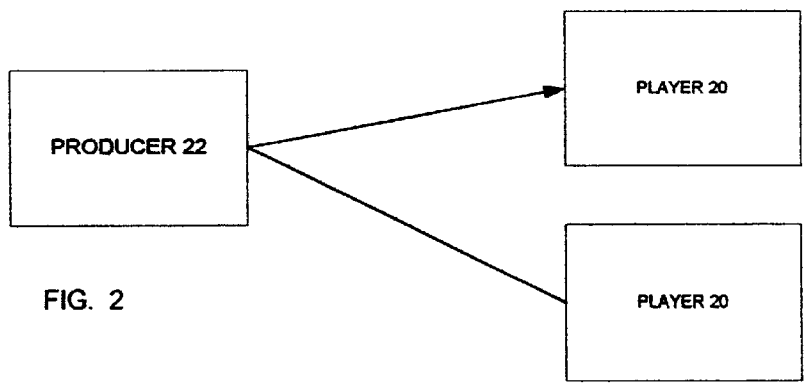
FIG. 2 shows a generic block diagram of the distribution system in accordance with this invention.

Referring now to FIG. 2, the medium 16 has now been is distributed to various entities such as retailer outlets, radio and/or tv broadcasters, and even individual listeners. However, the medium 16 has been recorded so that it cannot be replayed on a standard player. Instead, each receiving entities is provided (or buys) a special playing device 20. Playing device 20 is adapted to receive a control signal from a producer 22. The producer generates this control signal in order to allow the data on the medium 16 to be played. Once the device 20 receives this control signal, it retrieves the data from the medium 16, and using the control signal received from produced 22, it reverses the effects of the encrypted or otherwise manipulates the data from medium 16 so that plain data is generated which can be replayed in the usual manner.

Figure 3A:
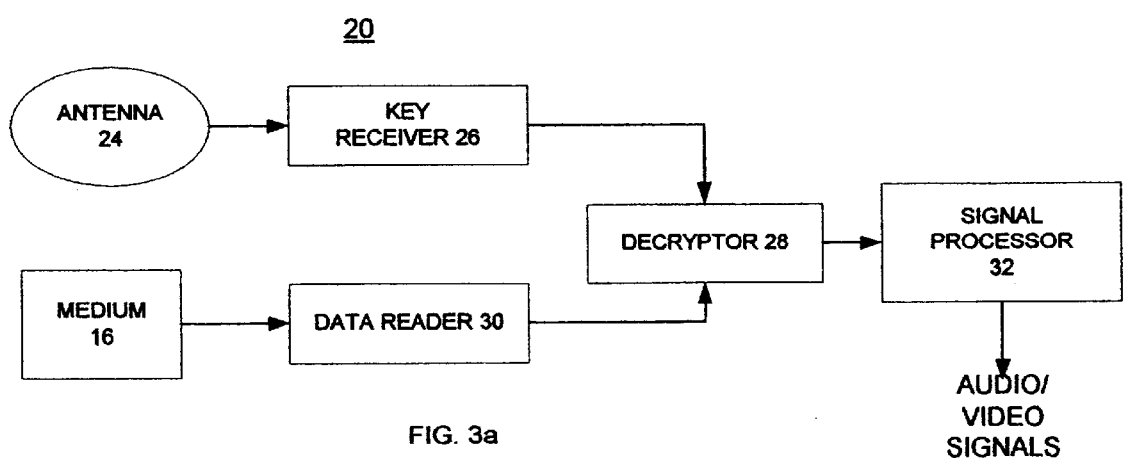
FIG. 3a shows a block diagram of a first embodiment of the media player.

For instance, referring first to FIG. 3a, the data on medium 16 has been encrypted using a specific encryption key and encryption algorithm. The device 20 includes an antenna 24 for receiving the control signal from the producer 22 which in this case is the decryption key. The key is received by receiver 26 and sent to a decryptor 28. Prior to receiving the key, the decryptor cannot generate data from media 16. After the key is received, encrypted data is read from medium 16 by data reader 30 and sent to the decryptor 28. Using the key from the producer 22, the decryptor 28 decrypts this data and sends the resulting plain data to a signal processor 32. The signal processor 32 processes the data and generates corresponding video or audio signals which are then fed to speakers, tv receivers and so on.

Figure 3B:
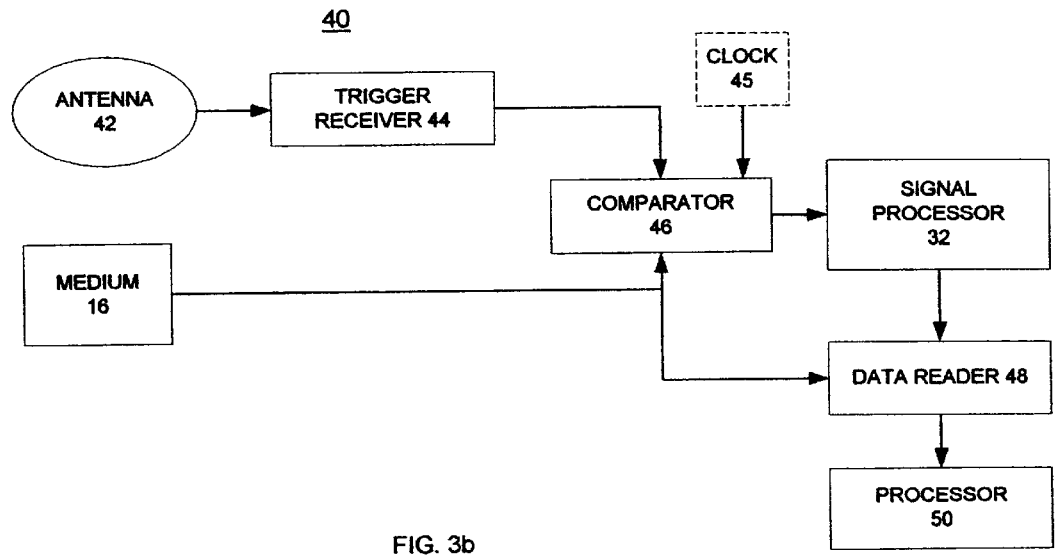
FIG. 3b shows a block diagram of a second embodiment of the media player.

Alternatively, as discussed above, the medium 16 may incorporate only a time stamp or other trigger signal indicative of when its contents can be played. For this scheme, as shown in FIG. 3b, a receiver 40 is provided having an antenna 42, a trigger receiver 44. The output of the trigger receiver 44 is connected to an input of a comparator 46. A second input of the comparator 46 receives data from the medium 16. More specifically, comparator 46 reads the information stored on medium 16 which specifies the trigger signal required to permit the medium to be played. When the trigger signal is sensed by the comparator 46, it compares it with the trigger signal and if they match, the comparator 46 generates an enabling signal. This enabling signal is fed to data reader 48 which then reads the data from the medium 16. This data is fed to a processor 50 were the data is processed in a manner similar to the manner descried for FIG. 3a.

Figure 4:
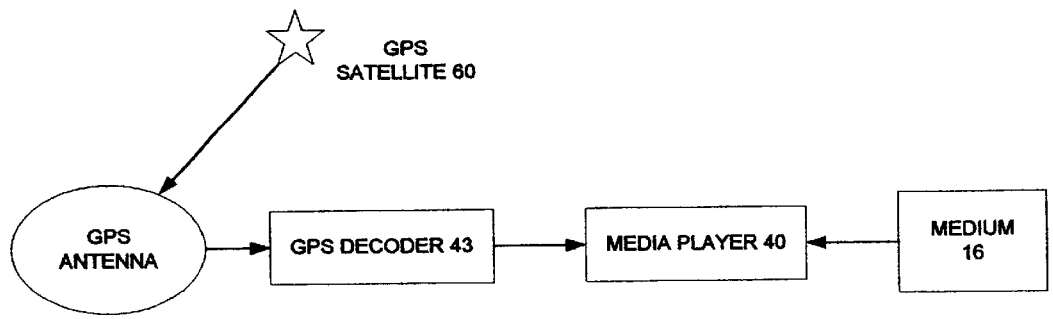
FIG. 4 shows a first scheme for distributing a control signal.

Various schemes for transmitting the control signal from the producer to the receivers are now described. Staring with FIG. 4, it is first assumed that the medium 16 contains plain data with a time stamp. For instance the time stamp may be—Dec. 1, 1998, 1:00 a.m.—. The receiver 40 in this case receives standard G.P.S. signals from a common G.P.S. satellite 60. (In this case the producer 22 does not have to generate a separate signal). The receiver 40 incorporates a G.P.S. decoder to decode the signal from the satellite 60. When based on this signal the receiver determines that the time set by the time stamp has occurred, its output is enabled to release the data on medium 16. While a G.P.S. satellite has been described herein, it should be understood that other time signal may be used as well, such as shortwave timing signals and other.

In the simplest embodiment of the invention, the trigger receiver 44, instead of looking for an external trigger, for instance from antenna 42, may instead use an internal clock signal as the trigger. In this scheme, the player 40 includes an internal clock 45 in FIG. 3b generating date as well as time indicative signals. These signals are fed to the comparator 46 which compares the same to the date and time stamp from the media 16 and allows reading the media 16 only after a match is detected.

Figure 5:
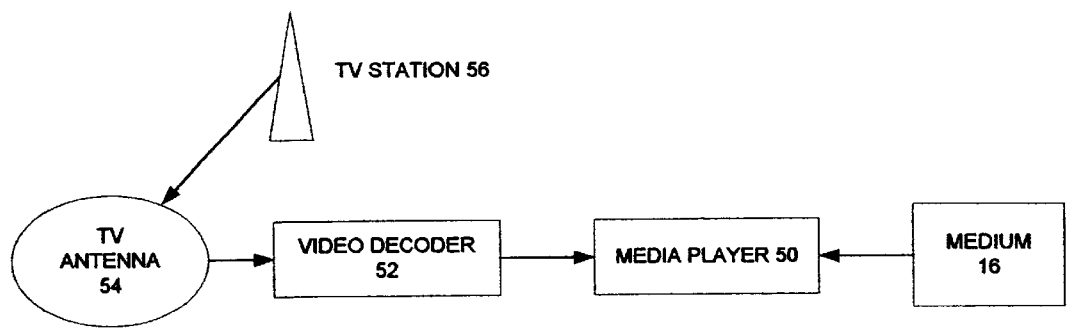
FIG. 5 shows a second scheme for distributing a control signal.

Referring now to FIG. 5, receiver 50 is associated with or includes a video decoder 52 and a video antenna 54 receiving video signals from a remote broadcast station 56. Remote station 56 normally transmits standard tv programs which are ignored by the decoder 52. However, at a critical time, a release signal is embedded in the video signal by the producer. For instance this signal may be embedded in the vertical blanking period of a designated tv channel for a predetermined time period. The time period is selected allow sufficient time for all the remote receivers 50 to detect the release signal. The release signal is detected by the video decoder 52 which in response sends an enabling or control signal to the reader 50 to allow it to read media 16.

Figure 6:
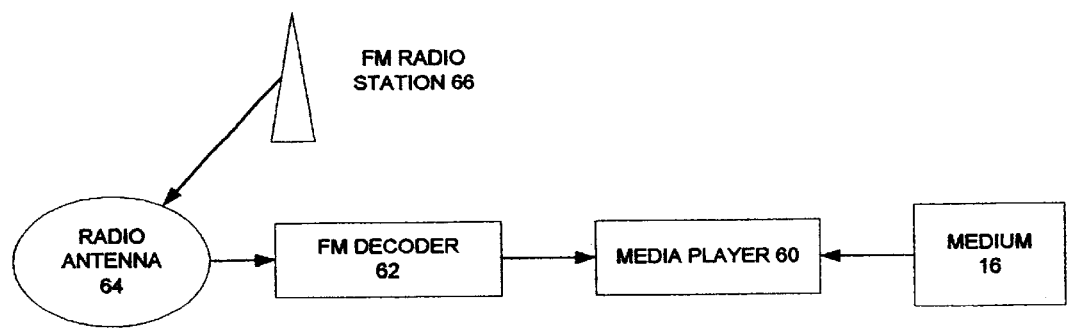
FIG. 6 shows a third scheme for distributing a control signal.

The embodiment of FIG. 6 is similar to the embodiment of FIG. 5, with the exception that the receiver 60 is associated with an FM decoder and an FM antenna 64 receiving signals from a remote FM radio station 66. In this case the release signal is embedded into an FM signal and is detected by FM decoder 62. This decoder 62 then sends an appropriate release or control signal to receiver 60 as before.

The embodiments described above refer to the programs to be released as being distributed and fixed in a physical media such as a cassette, a CD, a DVD and so on. Obviously, the programs may also be distributed electronically via public and private communications channels, the Internet, rf channels and so on. In this case, the programs are received and stored by the receivers in a memory and then read and played after the appropriate release or control signal is received.

Figure 7:
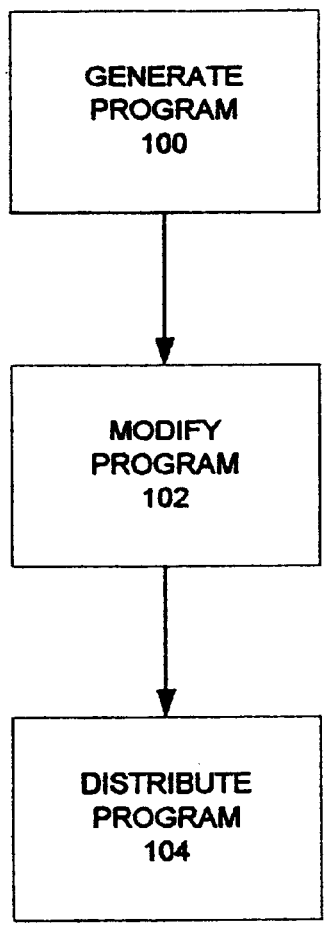
FIGS. 7–10 show flow charts illustrating various modes of operation on the subject system.
Figure 8:
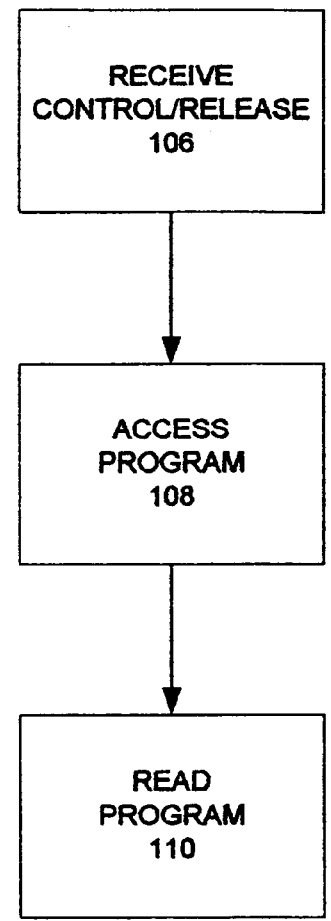

In summary, as shown in FIG. 7, a program is first generated by usual means (step 100) in the form of digital data. Next, in step 102, the program is modified, either by encrypting it, or by adding to a date/time stamp or other designating or other specific data which restricts its replay or reading. Finally, in step 104, the program is distributed either by recording it on a media 16, or electronically. However, program cannot be played yet on any receiver until the producer of the program generates a release signal and/or another control signal is generated. More specifically, in FIG. 8, step 106 a release signal is either generated or a control signal is otherwise generated to indicated that the program resulting form the process of FIG. 7 can be played. In step 108, each receiver in response to the release/control signal access the data for the program. In step 110 the data CL is decrypted(if necessary), read and played using a suitable signal processing apparatus.

Figure 9:
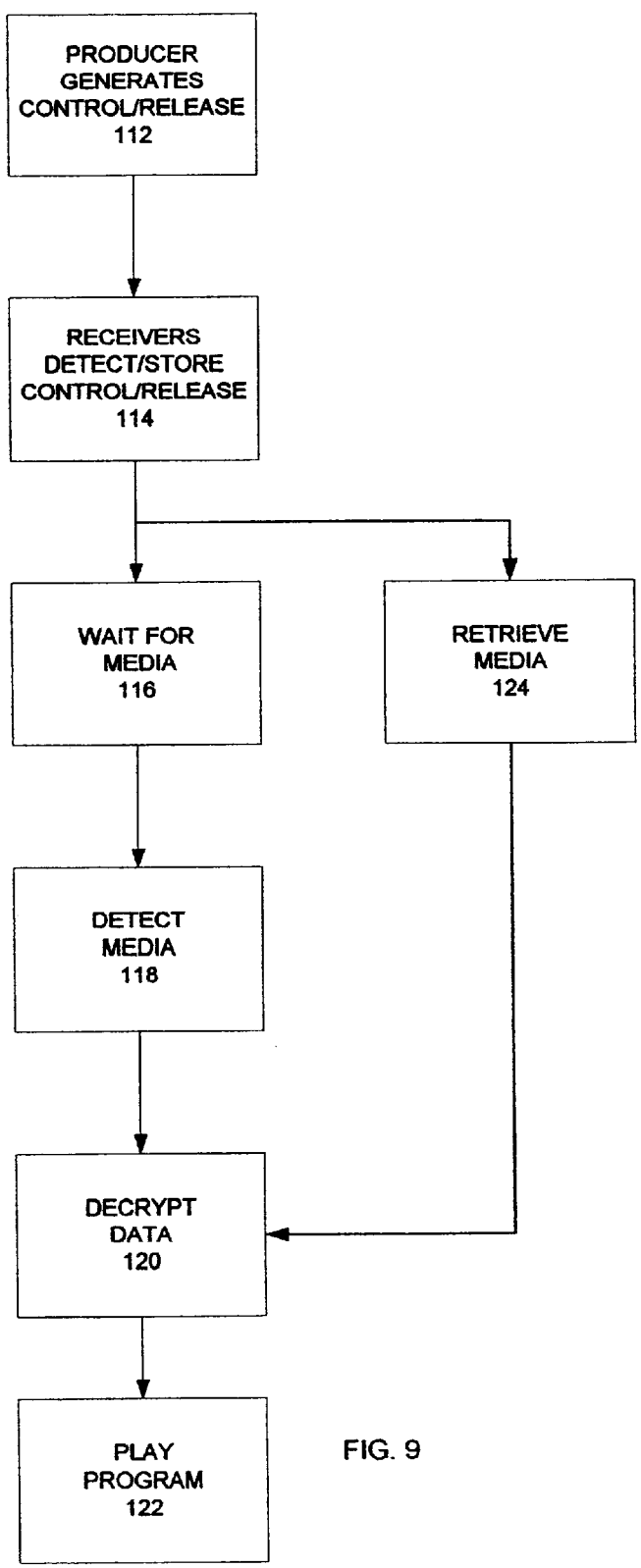

One mode of operation for implementing the invention, and more specifically, the embodiment wherein the producer generates a release signal and broadcasts it to the receivers is shown in FIG. 9. In step 112 the release signal is broadcast by the producer. In step 114 the receivers detect the release signal and store it. In step 116 each receiver waits for the media 16 to be inserted (assuming that the program has been distributed on a recoding media). In step 118 the media is detected, i.e., a customer, or a disk jockey, who has been previously been notified that the program can be played has inserted the media into the receiver. In step 120 the data on the media is decrypted and in step 122 the program is played. Alternatively, if the program has been distributed electronically, in step 124, in response to a local command from an operator of the receiver, the data corresponding to the program is retrieved from the memory and then is processed in steps 120, 122.

Figure 10:
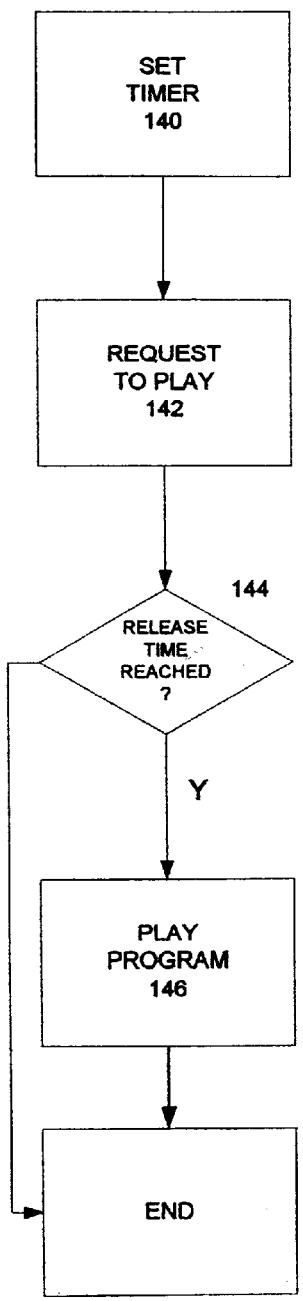

FIG. 10 illustrates a typical operation wherein the producer does not broadcast a release signal but instead, a standard timing signal is used. In this embodiment, in step 140 an internal timer is set using an external universal timing signal such as a G.P.S. system. In step 142 a request to play the program is received either by inserting the medium into the receiver, or if the program data is stored into memory, by some other control means. Next, in step 144 a check is performed to determine if the release time as indicated by the date/time stamp has been reached by comparing the same to the timing signal. If the release time has not been reached, the program is not played. If the release time has been reached, the receiver is allowed to process the data and play the program (step 146).

Obviously numerous modifications may be made to this invention without departing from its scope as defined in the appended claims.

We claim:

1. A system for distributing a program and controlling its release or play, said system comprising:
    a program distribution center adapted to distribute multiple copies of a program, said program including a blocking component that prevents said program from being played;
    a release signal generator that selectively generates a release/control signal; and
    a plurality of receivers, each receiver including a detector for detecting said release/control signal and a player for playing said program by using said release/control signal to disable said blocking component;
    wherein all the receivers receive said release/control signal simultaneously.

2. The system of claim 1 wherein said program is encrypted and wherein said release/control signal includes information for decrypting said program by each said receiver.

3. The system of claim 1 wherein said release signal generator includes a tv transmitter generating tv signals with said release/control signal being imbedded in said tv signals and each said receiver includes a tv signal receiver for receiving said tv signals.

4. The system of claim 1 wherein said release signal generator includes a radio transmitter generating radio signals with said release/control signal being imbedded in said radio signals, and each said receiver includes a radio receiver for receiving said radio signals.

5. The system of claim 1 wherein said release signal generator generates said release/control signal in response to a command.

6. A plurality of receivers for playing a program, each of said receivers comprising:
    a control signal detector for detecting a release/control signal from a remote location, said release/control signal being provided to all the receivers simultaneously; and
    a player adapted to play said program any time after said release/control signal is detected, said player being blocked from playing said program before said release/control signal is detected.

7. The plurality of receivers of claim 6 wherein said program is recorded on a medium and wherein each said player is adapted to play said program from said medium.

8. The plurality of receivers of claim 6 wherein said program is transmitted electronically and wherein each said receiver includes a memory for storing said program with each said player retrieving said program from said memory in response to said release/control signal.

9. The plurality of receivers of claim 6 wherein said release/_control signal is transmitted from a remote location as part of standard tv signals, and wherein each said detector includes a tv signal receiver that receives said tv signals.

10. The plurality of receivers of claim 6 wherein said release/_control signal is transmitted from a remote location as part of radio waves and wherein each said detector includes a radio detector for detecting said radio waves.

11. The plurality of receivers of claim 6 wherein said release/control signal includes a decryption key, and wherein each said player includes a decryptor for decrypting said program using said decryption key.

12. The method of claim 6 further comprising generating said release/control signal by the producer of said program.

13. A method for distributing a program so that said program can be played by different receivers, comprising:
    generating said program;
    modifying said program to include a blocking component that prevents said program from being played;
    distributing the modified program to several receivers;
    distributing a common release/control signal simultaneously for all said receivers;
    at each of said receivers, detecting said common release/control signal; and
    using said release/control signal to disable said blocking component and to allow a plain program to be played from said modified program.

14. The method of claim 13 wherein said program is modified by encryption and wherein said time release signal is used to decrypt said encrypted program.

15. The method of claim 13 wherein said release/control signal is broadcast to said receivers.

16. The method of claim 15 wherein said release/control signal is broadcast using a tv signal.

17. The method of claim 15 wherein said release/control signal is broadcast using a radio signal.

* * * * *